(12) United States Patent
Crombez

(10) Patent No.: US 8,248,221 B2
(45) Date of Patent: Aug. 21, 2012

(54) METHOD AND SYSTEM FOR DISPLAYING RECOVERED ENERGY FOR A HYBRID ELECTRIC VEHICLE

(75) Inventor: Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 430 days.

(21) Appl. No.: 12/510,518

(22) Filed: Jul. 28, 2009

(65) Prior Publication Data

US 2011/0023772 A1 Feb. 3, 2011

(51) Int. Cl.
*B60Q 1/00* (2006.01)

(52) U.S. Cl. ............... 340/439; 180/65.21; 180/65.31; 340/461; 701/22; 701/70; 903/903; 903/930

(58) Field of Classification Search .............. 340/453, 340/425.5, 438, 439, 456, 441, 461, 455, 340/636, 459, 636.1, 636.2; 320/119, 122; 903/907, 930, 903; 180/65.265, 65.31, 65.21, 180/165; 701/22, 70; 116/28 R; 318/376
See application file for complete search history.

(56) References Cited

U.S. PATENT DOCUMENTS

| | | | |
|---|---|---|---|
| 5,698,983 A | 12/1997 | Arai et al. | |
| 5,939,861 A | 8/1999 | Joko et al. | |
| 6,480,106 B1 | 11/2002 | Crombez et al. | |
| 6,581,707 B2 | 6/2003 | Morimoto et al. | |
| 6,794,853 B2 | 9/2004 | Kondo | |
| 2002/0171541 A1* | 11/2002 | Crombez et al. | 340/461 |
| 2007/0176762 A1 | 8/2007 | Aoyagi et al. | |
| 2007/0295544 A1* | 12/2007 | Borroni-Bird et al. | 180/165 |
| 2007/0296567 A1 | 12/2007 | Tamai et al. | |
| 2008/0042821 A1 | 2/2008 | Kaya | |
| 2009/0040033 A1* | 2/2009 | Uchida | 340/439 |
| 2010/0030413 A1* | 2/2010 | Jinno | 701/22 |
| 2010/0106353 A1* | 4/2010 | Watson et al. | 701/22 |

* cited by examiner

*Primary Examiner* — Brent Swarthout
(74) *Attorney, Agent, or Firm* — Jennifer M. Stec; Brooks Kushman P.C.

(57) ABSTRACT

An information display configured to display one or more energy efficiency values of a vehicle. The information display system may comprise an information display configured to display an energy recovered indicator corresponding to a ratio of the braking energy recovered using a regenerative braking system. The information display may include both an overall energy recovered indicator and an instantaneous energy recovered indicator.

16 Claims, 3 Drawing Sheets ly related to the actual driving habits of the operator. The recovered energy display 54 may provide the operator with an indication of how driving behavior affects the recovery of energy, which may lead to changes in driving habits to yield improved fuel economy.

METHOD AND SYSTEM FOR DISPLAYING RECOVERED ENERGY FOR A HYBRID ELECTRIC VEHICLE

BACKGROUND

1. Technical Field

One or more embodiments of the present disclosure relate to a system and method for indicating energy recovered by a regenerative braking system of a vehicle.

2. Background Art

Vehicles, whether passenger or commercial, include a number of gauges, indicators, and various other displays to provide the vehicle operator with information regarding the vehicle and its surroundings. With the advent of new technologies, such as hybrid electric vehicles (HEVs), has come a variety of new gauges and information displays that help operators to better learn the operation of these vehicles that utilize new technology. For example, many HEVs incorporate gauges that attempt to provide the operator with information on the various hybrid driving states. These gauges indicate to the operator when the vehicle is being propelled by the engine alone, the motor alone, or a combination of the two. Similarly, a display may indicate when the motor is operating as a generator, and is recharging an energy storage device, such as a battery.

With regard to HEVs, it is known that some operators may not be able to achieve desired overall fuel economy, in part because of driving habits. In many cases, operators are willing to modify their behavior, but are unable to translate recommended techniques into real changes in their driving habits. Moreover, conventional gauges or displays may be misleading as to how information pertaining to energy recaptured during braking may correlate to future fuel economy of the vehicle. As such, the operator may not be able to adapt current driving habits so as to increase the future fuel economy.

DETAILED DESCRIPTION

Hybrid vehicles may include conventional information displays, or gauges, with the goal of informing an operator about the hybrid driving states. The hybrid driving states may be displayed so that the operator may modify operation of the vehicle in order to improve the fuel economy ("FE") of the vehicle. For example, many hybrid vehicles provide a conventional "power assist gauge" to indicate when the vehicle is operating an electric motor to assist in accelerating the hybrid vehicle. In addition, the conventional "power assist gauge" may indicate when the electric motor is being used to charge a battery of the vehicle during regenerative braking.

In combination with conventional instantaneous fuel economy gauges, such conventional information displays may give the operator a false sense of improved efficiency when braking. The false sense of improved fuel economy may be attributed to the fact that, during braking, a relatively high instantaneous fuel economy value may be displayed as well as an indication that the battery is recapturing energy using the regenerative braking system. The instantaneous FE value is high since the vehicle is no longer consuming fuel. Although regenerative braking may assist in improving the FE of the hybrid vehicle, better FE may be achieved if the driver operates the hybrid vehicle in a less aggressive manner (e.g., milder acceleration and deceleration).

Stated differently, the conventional information display does not indicate to the operator that the energy recaptured by the regenerative braking system has been exhausted and that energy is being lost through the use of friction braking. Rather, the conventional information display may lead the operator into believing that even aggressive braking improves the overall fuel economy since conventional instantaneous fuel economy gauges may spike, saturate, or max out during deceleration.

Figure 1:
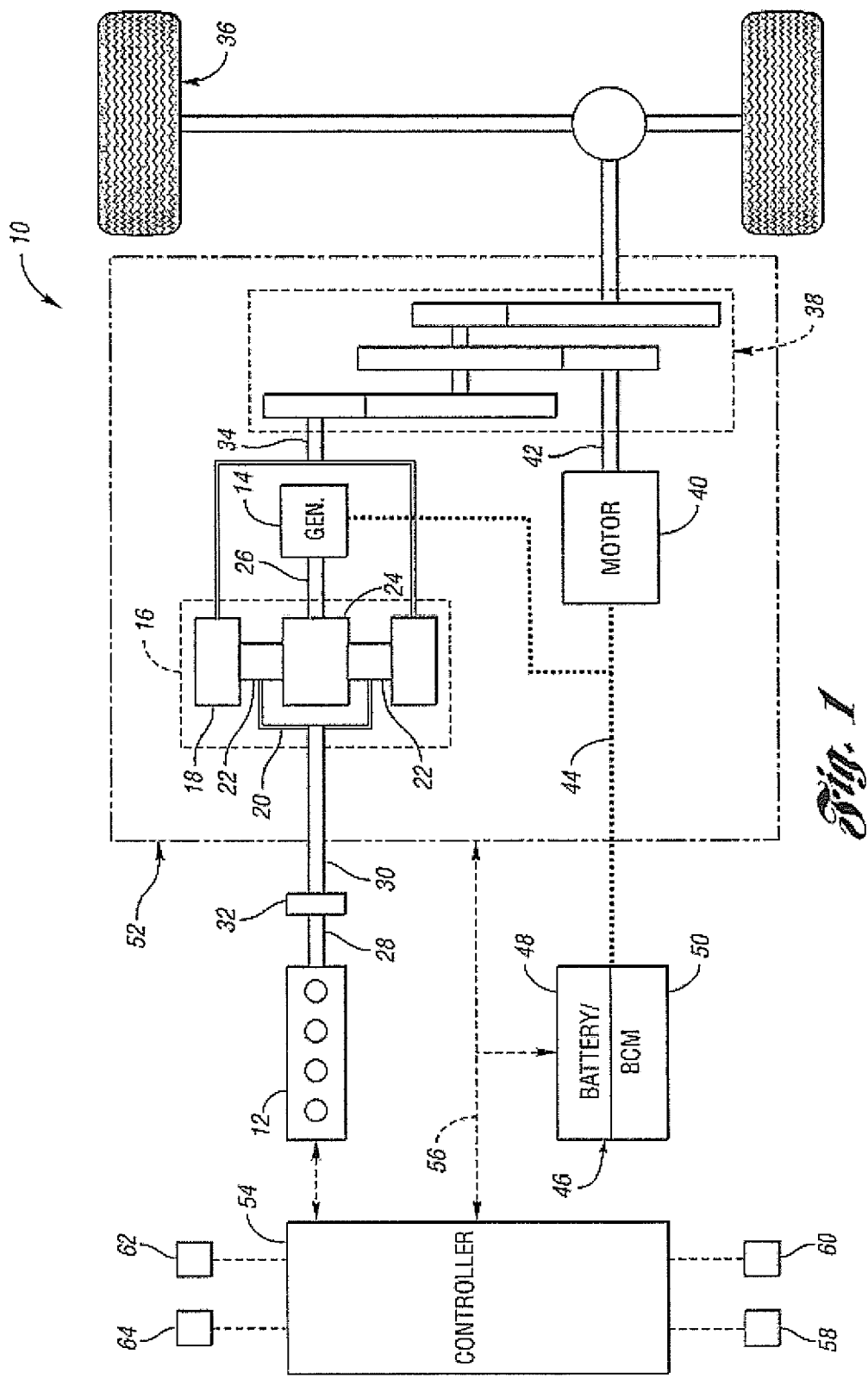
FIG. 1 shows a schematic representation of a hybrid electric vehicle including an information display in accordance with an embodiment of the present disclosure.

In light of the foregoing, FIG. 1 shows a schematic representation of a vehicle 10 according to one or more embodiments of the present disclosure. The vehicle 10 may include an engine 12 and a first electric machine, or generator 14. The engine 12 and the generator 14 may be connected through a power transfer arrangement, which in this embodiment, is a planetary gear arrangement 16. Of course, other types of power transfer arrangements, including other gear sets and transmissions, may be used to connect the engine 12 to the generator 14. Furthermore, the planetary gear arrangement 16 may include a ring gear 18, a carrier 20, planet gears 22, and a sun gear 24.

The generator 14 can also output torque to a shaft 26 connected to the sun gear 24. Similarly, the engine 12 can output torque to a crankshaft 28, which is connected to a shaft 30 through a passive clutch 32. The clutch 32 may provide protection against over-torque conditions. The shaft 30 may be connected to the carrier 20 of the planetary gear arrangement 16, and the ring gear 18 may be connected to a shaft 34, which is connected to a first set of vehicle drive wheels, or primary drive wheels 36, through a gear set 38.

The vehicle 10 may include a second electric machine, or motor 40, which can be used to output torque to a shaft 42 connected to the gear set 38. Other vehicles within the scope of the present disclosure may have different electric machine arrangements, such as more or fewer than two electric machines. In the embodiment shown in FIG. 1, the electric machine arrangement (i.e. the motor 40 and the generator 14) can both be used as motors to output torque. Alternatively, each can also be used as a generator, outputting electrical power to a high voltage bus 44 and to an energy storage system 46, which includes a battery 48 and a battery control module (BCM) 50.

The battery 48 may be a high voltage battery that is capable of outputting electrical power to operate the motor 40 and the generator 14. The BCM 50 acts as a controller for the battery 48. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 52. To control the engine 12 and components of the transmission 52 (i.e., the generator 14 and motor 40) a vehicle control system, shown generally as controller 54, may be provided. Although it is shown as a single controller, it may include multiple controllers which may be used to control multiple vehicle systems. For example, the controller 54 may be a vehicle system controller/powertrain control module (VSC/PCM).

A controller area network (CAN) 56 can allow the controller to communicate with the transmission 52 and the BCM 50. Just as the battery 48 includes a BCM 50, other devices may have their own controllers. For example, an engine control unit (ECU) may communicate with the controller 54 and may perform control functions on the engine 12. In addition, the transmission 52 may include a transmission control module (TCM), configured to coordinate control of specific components within the transmission 52, such as the generator 14 and/or the motor 40. Some or all of these various controllers can make up a control system in accordance with the present disclosure. Although illustrated and described in the context of the vehicle 10, which is an HEV, it is understood that embodiments of the present disclosure may be implemented on other types of vehicles, such as those powered by an electronic motor alone. It is further understood that embodiments of the present disclosure may be implemented on vehicles which incorporate at least one alternative energy recovery and storage device such as a flywheel device, a hydraulic device, or a pneumatic device. Lastly, the present disclosure contemplates that the alternative energy recovery and storage device may, or may not, be integrated with a secondary propulsion machines such as a liquid fueled engine or electric machine.

Also shown in FIG. 1 are simplified schematic representations of a braking system 58, an accelerator pedal 60, and an air conditioning system 62. The braking system 58 may include such things as a brake pedal, position sensors, pressure sensors, or some combination of the two, as well as a mechanical connection to the vehicle wheels, such as the wheels 36, to effect friction braking. One or more embodiments of the present disclosure further contemplate that the braking system 58 may also include a regenerative braking system, wherein braking energy is captured and stored as electrical energy in the battery 48. Of course, it should be noted that a regenerative braking system other than an electrical regenerative braking system may also be included as part of the braking system 58 (e.g., a hydraulic regenerative braking system, mechanical regenerative braking system, or the like). Similarly, the accelerator pedal 60 may include one or more sensors, which, like the sensors in the braking system 58, communicate with the controller 54.

The air conditioning system 62 also communicates with the controller 54. The on/off status of the air conditioning system can be communicated to the controller 54, and can be based on, for example, the status of an operator actuated switch, or the automatic control of the air conditioning system 62 based on related functions such as window defrost. In addition to the foregoing, the vehicle 10 includes a display system 64, which, as explained in greater detail below, may provide information indicative of energy recovered to the operator of the vehicle 10.

Figure 2:
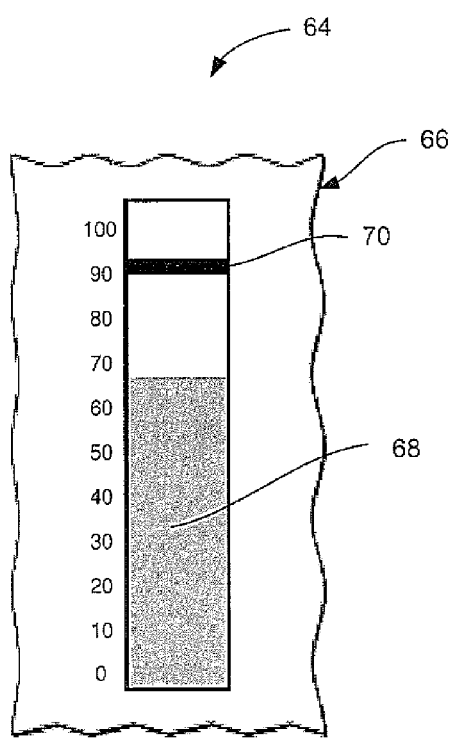
FIG. 2 shows in detail the information display depicted in FIG. 1.

FIG. 2 generally illustrates the display system 64 according to one or more embodiments of the present disclosure. The display system 64 may include electronics, including software, which are not illustrated in FIG. 2. Furthermore, the present disclosure contemplates that the display system 64 may be incorporated within an instrument cluster display, a center counsel display, an overhead display, or any other display within a vehicle suitable for displaying information indicative of vehicle operating conditions to an operator of the vehicle 10.

The display system 64 may further include one or more information displays 66 to display information indicative of vehicle operating conditions. Furthermore, the information display 66 may indicate information pertaining to vehicle operating conditions using any number of analog displays and/or gauges. Alternatively, the information display 66 may display information indicative of vehicle operating conditions using any number of digital displays and/or gauges. For example, the information display 66 may display information indicative of vehicle operating conditions using a liquid crystal display (LCD), a plasma display, an organic light emitting display (OLED), or any other display suitable to display fuel vehicle operating conditions.

The display system 64 may further include a controller, which, for reference purposes, may be the controller 54 described in FIG. 1. The controller 54 may be configured to receive sensed, and/or non-sensed, inputs that relate to current operating conditions of the vehicle 10. Furthermore, the controller 54 may provide outputs to the display system 64 such that the information indicative of vehicle operating conditions may be displayed using the information display 66.

The present disclosure further contemplates that the information display 66 may display information indicative of how much energy has been recovered by the braking system 58 during operation of the vehicle 10. More particularly, the information display 66 may display a value indicative of the ratio of overall energy recovered using an overall energy recovered indicator 68. The present disclosure further contemplates that the information display 66 may be configured such that the value of overall energy recovered may be displayed as a long-term, trip, or average energy recovered value. For example, the controller 54 may determine a long-term energy recovered value using a predetermined period of time. Also, the controller 54 may determine a trip energy recovered value using a distance traveled by the vehicle 10. Lastly, the controller 54 may determine the average energy recovered value using a predetermined rolling average. The controller 54 may transmit the determined overall energy recovered value so that the information display 66 adjusts the overall energy recovered indicator 68 based upon the overall energy recovered value.

In order to determine the overall energy recovered value, the controller 54 may use a ratio between the regenerative braking energy recovered and total braking energy demanded. In this regard, the overall energy recovered value may be provided as a percentage of energy recovered. The present disclosure contemplates that the controller 54 may determine the overall energy recovered value using the following, exemplary equation:

$$\text{Energy\_Recovered} = \frac{\text{Regenerative\_Braking\_Energy}}{\text{Total\_Braking\_Energy}} \quad (1)$$

where,

Energy_Recovered is the determined overall energy recovered value;

Regen_Braking_Energy is the total regenerative energy recovered through operation of the regenerative braking system; and Total_Braking_Energy is the total braking energy requested by the driver.

With reference to Equation (1), the controller 54 may determine the amount of energy recovered through the regenerative braking system using a number of received sensed and/or non-sensed inputs. For example, the controller 54 may receive inputs indicative of how much energy is recovered by the battery 48 while the regenerative braking system is operating. Furthermore, the total braking energy requested may be determined by the controller 54 using sensed and/or non-sensed inputs relating to the operation of the accelerator pedal 60 and/or braking system 58.

The present disclosure further contemplates that the information display 66 may include an instantaneous energy recovered indicator 70 which may be used to display information indicative of an instantaneous energy recovered value. However, as is well known to one skilled in the art, energy may generally be determined as accumulated power over a period of time. As such, the instantaneous energy recovered value may not be an actual energy recovered value but may rather be an instantaneous value of power or torque being returned to the battery as regenerative power or torque. It is further known to one skilled in the art that the ratio of instantaneous power or torque over time may directionally influence the overall energy recovered indicator 68. For example, the controller 54 may determine the instantaneous energy recovered value using the following, exemplary equation:

$$IER = \frac{Regen\_Torque}{Regen\_Torque + Friction\_Torque} \quad (2)$$

where,

IER is the determined instantaneous energy recovered value;

Regen_Torque is a determined regenerative torque of the vehicle 10; and

Friction_Torque is a determined friction torque of the vehicle 10.

As illustrated by Equation (2), the controller 54 may determine the regenerative torque as a function of a number of sensed and/or non-sensed inputs. For example, the regenerative torque may be determined using information indicative of the power and acceleration of the vehicle 10. Alternatively, the regenerative torque may be determined using information indicative of the power and speed of the vehicle 10.

In addition, the controller 54 may determine the friction torque as a function of a number of sensed and/or non-sensed inputs. The friction torque may also be determined using information indicative of the power and acceleration of the vehicle 10. Alternatively, the regenerative torque may be determined using information indicative of the power and speed of the vehicle 10.

However, the present disclosure contemplates that the use of torque is not inclusive and the controller 54 may determine the instantaneous energy recovered as a function of regenerative power and friction power; regenerative acceleration and friction acceleration; or, regenerative force and friction force. Hence, the controller 54 may determine the instantaneous energy recovered value using at least one of the determined regenerative torque, power, acceleration, or force and at least one of the determined friction torque, power, acceleration, or force. As shown, the instantaneous energy recovered value may be provided as a percentage as well.

The present disclosure further contemplates that when the brakes are not being applied, the instantaneous energy recovered indicator 70 may display a maximum instantaneous energy recovered value. Furthermore, the instantaneous energy recovered indicator 70 may remain at a maximum instantaneous energy recovered value until the regenerative braking energy is maximized and/or the friction braking system is operated.

For example, if the operator is not operating the braking system 58, the instantaneous energy recovered indicator 70 may indicate an instantaneous energy recovered value of one hundred (100) percent (%). Furthermore, as the brakes are applied, the instantaneous energy recovered indicator 70 may remain at a value of one hundred percent until the amount of energy recovered using the regenerative braking system has been maximized and the friction braking system is engaged.

Figure 3:
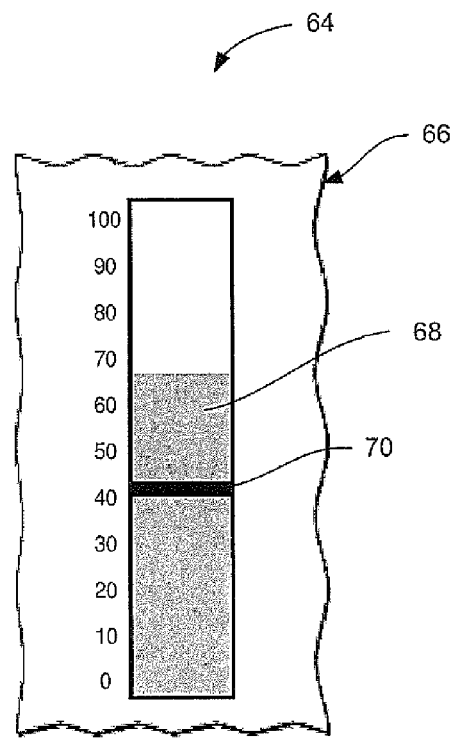
FIG. 3 shows an alternate view of the information display.

As is further illustrated in FIG. 2, the instantaneous energy recovered indicator 70 may be displayed, and remain, above the average energy recovered indicator 68 as long as the instantaneous energy recovered value exceeds the overall energy recovered value. As long as the instantaneous energy recovered value exceeds the overall energy recovered value, the overall energy recovered value will increase over time. However, as illustrated in FIG. 3, if the instantaneous energy recovered value does not exceed the overall energy recovered value, the instantaneous energy recovered indicator 70 may be equal to or less than the overall energy recovered indicator 68.

The present disclosure contemplates that the overall and instantaneous energy recovered indicators 68, 70 may display information indicative of inefficient vehicle operation due to aggressive driving and/or braking, which may result in a lower FE. For example, if the operator is aggressively decelerating the vehicle 10 the overall and/or instantaneous energy recovered indicators 68, 70 may begin to decline so as to indicate a lower percentage of energy being recovered out of the total braking energy requested by the operator. This can be due to the increased application of the friction braking system to accommodate for the total brake demand when braking more aggressively. By indicating to the operator that the overall and/or instantaneous energy recovered value is declining, the operator may begin to understand how aggressive operation of the vehicle 10 may affect the FE. By understanding how efficient braking may correlate to a greater amount of energy recovered, the operator may modify operation of the vehicle 10 in order to increase the FE of the vehicle 10.

Figure 4:
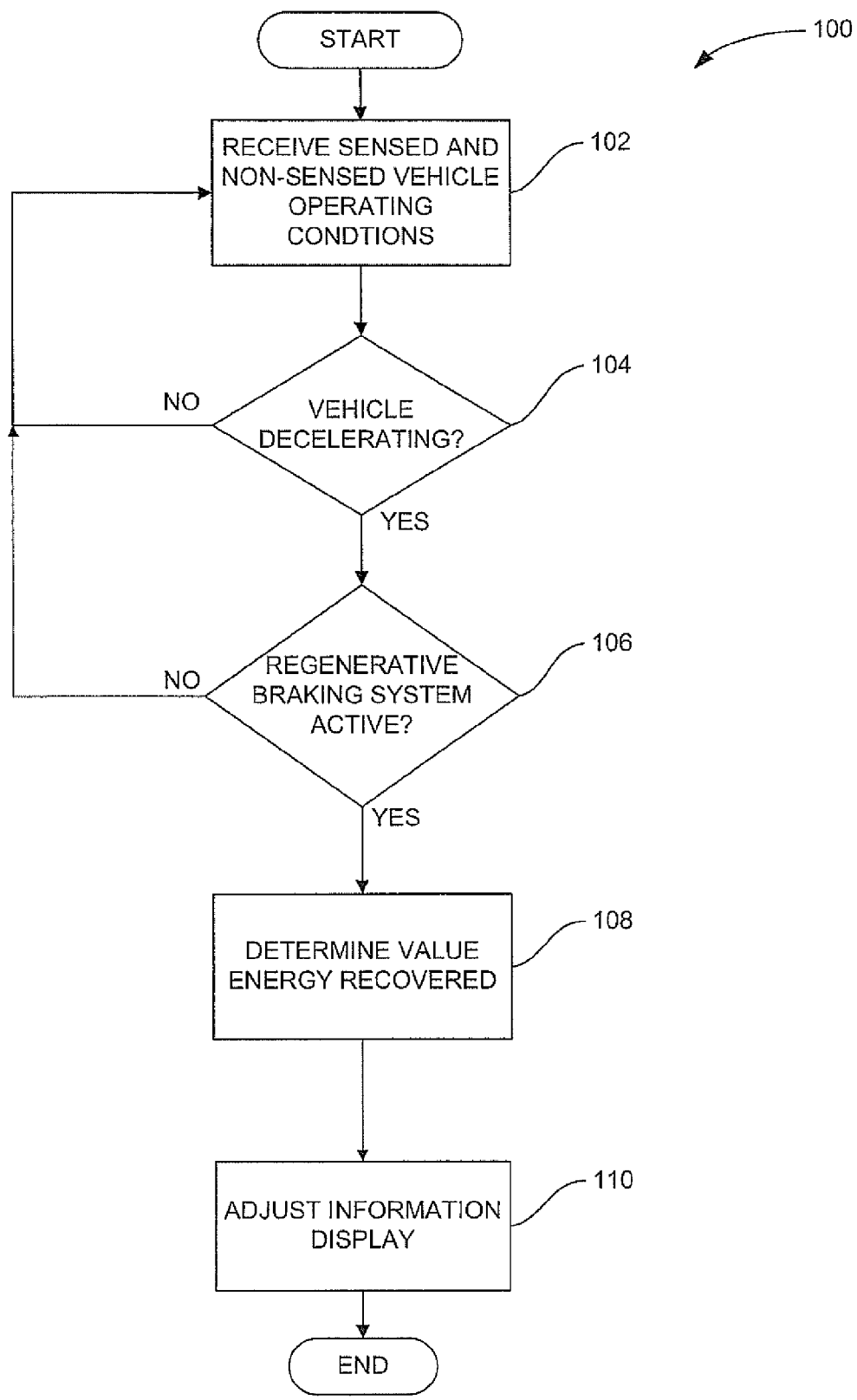
FIG. 4 is a simplified, exemplary flow chart depicting one or more embodiments of the present disclosure described herein.

FIG. 4 illustrates a simplified, exemplary flow diagram 100 illustrating how the instantaneous and/or overall energy recovered value may be determined. However, it should be noted that the flow diagram 100 illustrated in FIG. 4 is merely exemplary, and the operation, function or steps of the method may be performed in a fashion other than the order described herein.

With reference to operation 102, any number of sensed and/or non-sensed vehicle inputs that correspond to current operating conditions of the vehicle 10 may be received. The received inputs may be used by the controller 54 to determine the overall and/or instantaneous energy recovered value by the vehicle 10. For example, the number of sensed and/or non-sensed vehicle inputs may include an overall speed or acceleration of the vehicle 10; a current IFE of the vehicle 10; a signal indicating when the regenerative braking system is active; a signal indicating the level of friction braking being applied to the vehicle 10; a signal indicating the level of regenerative braking being applied to the vehicle 10; or, a deceleration force of the vehicle 10. Once the sensed and/or non-sensed inputs are received by the controller 54 the flow diagram 100 proceeds to operation 104.

In operation 104, the controller 54 may determine if the vehicle is decelerating. One ordinarily skilled in the art would contemplate that deceleration of the vehicle 10 may not necessarily be indicated by the slowing of the vehicle 10, but rather the use of systems which may influence the motion of the vehicle 10. For example, the controller 54 may determine that the vehicle 10 is decelerating if the braking system 58 (e.g., friction and/or regenerative braking systems) are being operated. Alternatively, the controller 54 may determine if the braking system 58 is being operated even when the vehicle 10 is accelerating. The present disclosure contemplates that such an operating condition may occur due to external influences acting upon the vehicle 10 (e.g., operation of the braking system 58 when the vehicle 10 is accelerating due to traveling on a downward sloping road or hill). If the operator is not decelerating the vehicle 10 then the flow diagram 100 may proceed back to operation 102. However, if the operator is decelerating then the flow diagram 100 may proceed to operation 106.

In operation 106, the controller 54 may determine if the regenerative braking system is being operated. Alternatively, in operation 106 the controller 54 may determine if the vehicle 10 is being operated in such a fashion that the overall and/or instantaneous energy recovered value is at a minimal or zero value (i.e., percent). The present disclosure contemplates that such an operating condition may occur without the regenerative braking system being operated. If the controller 54 determines that the regenerative braking system is not being operated or the overall and/or instantaneous energy recovered value is at a minimal or zero value, then the flow diagram 100 proceeds back to operation 102. However, if the controller 54 determines that the regenerative braking system is being operated or the overall and/or instantaneous energy recovered value is not at a minimal or zero value, then the flow diagram 100 may proceed to operation 108.

In operation 108, the controller 54 may determine the amount of energy being recaptured using the regenerative braking system. For example, the energy recaptured value may be lower if the controller 54 determines that the friction braking system has been activated. The controller 54 may determine that energy recovered value may be lower due to the amount of braking power requested by the operator being exceeded by the braking capacity of the regenerative braking system. Once the controller 54 determines the amount (i.e., percent) of energy being recaptured by the regenerative braking system the flow diagram 100 proceeds to operation 110.

In operation 110, the controller 54 may transmit a signal indicative of the energy recovered value so that the display system 64 may adjust an energy indicator based upon the energy recovered value. More particularly, the controller 54 may transmit a signal indicative of the instantaneous and/or overall energy recovered value so that the display system 64 may adjust the overall and/or instantaneous energy recovered indicators 68, 70 based upon the instantaneous and/or overall energy recovered values.

While the best mode for carrying out the invention has been described in detail, those familiar with the art to which this invention relates will recognize various alternative designs and embodiments for practicing the invention as defined by the following claims.

What is claimed:

1. A display system for a vehicle comprising:
an information display including an energy recovered indicator; and
a controller configured to:
calculate an energy recovered value based at least in part upon an amount of energy recaptured using a regenerative braking system and a total amount of braking energy demanded; and
transmit a signal indicative of the energy recovered value so that the information display displays the energy recovered indicator based upon the energy recovered value.

2. The display system of claim 1, wherein the controller is further configured to determine when the regenerative braking system is decelerating the vehicle.

3. The display system of claim 2, wherein the controller is further configured to receive information indicative of the amount of energy being recaptured using the regenerative braking system during deceleration of the vehicle and the total amount of braking energy demanded from the regenerative braking system and a friction braking system.

4. The display system of claim 1, wherein the energy recovered value is a ratio of the amount of energy recaptured and the total amount of braking energy demanded.

5. The display system of claim 1, wherein the total amount of braking energy demanded is based in part upon an accelerator pedal position and a brake pedal position.

6. The display system of claim 1, wherein the energy recovered value displayed by the energy recovered indicator is an averaged value over a predetermined time period.

7. The display system of claim 1, wherein the energy recovered value displayed by the energy recovered indicator is an averaged value over a distance traveled by the vehicle.

8. The display system of claim 1, further comprising an instantaneous energy recovered indicator corresponding to an instantaneous energy recovered value based upon a total regenerative braking torque and a total friction braking torque.

9. A display system for a vehicle comprising:
an information display including at least one energy recovered indicator; and
a controller configured to:
receive information corresponding to a braking system of the vehicle, wherein the braking system includes a friction braking system and a regenerative braking system; determine an at least one energy recovered percentage based upon operation of the regenerative braking system and the friction braking system; and
transmit the at least one energy recovered percentage so that the information display shows the at least one energy recovered indicator based upon the at least one energy recovered percentage.

10. The display system of claim 9, wherein the at least one energy recovered indicator comprises an overall energy recovered indicator and an instantaneous energy recovered indicator.

11. The display system of claim 10, wherein the at least one energy recovered percentage comprises an overall energy recovered percentage associated with the overall energy recovered indicator and an instantaneous energy recovered percentage associated with the instantaneous energy recovered indicator.

12. The display system of claim 11, wherein the overall energy recovered percentage is a ratio of a total amount of energy recaptured using the regenerative braking system over a total amount of braking energy demanded from the regenerative braking system and the friction braking system by an operator of the vehicle.

13. The display system of claim 12, wherein the instantaneous energy recovered percentage corresponds to an instantaneous percentage of total braking torque used by the regenerative braking system to decelerate the vehicle.

14. The display system of claim 12, wherein the instantaneous energy recovered percentage corresponds to an instantaneous percentage of total braking power applied to the regenerative braking system to decelerate the vehicle.

15. A method comprising:
- calculating an average energy recovered value based upon a ratio of an amount of energy recaptured by a regenerative braking system and a total amount of braking energy demanded during vehicle deceleration; and
- displaying, on a vehicle display, an average energy recovered indicator associated with the average energy recovered value.

16. The method of claim 15, further comprising:
- calculating an instantaneous energy recovered value based upon an instantaneous value of total braking power used by the regenerative braking system and an instantaneous value of total braking power used by the friction braking system; and
- displaying, on the vehicle display, an instantaneous energy recovered indicator associated with the instantaneous energy recovered value.

\* \* \* \* \*